(12) United States Patent
Nishide et al.

(10) Patent No.: US 9,213,208 B2
(45) Date of Patent: Dec. 15, 2015

(54) LIQUID CRYSTAL DISPLAY DEVICE COMPRISING VOLTAGE FLUCTUATIONS

(71) Applicant: KYOCERA Corporation, Kyoto-shi, Kyoto (JP)

(72) Inventors: Masahiko Nishide, Kyoto (JP); Hideaki Sakai, Kyoto (JP); Kenji Ogura, Kyoto (JP); Shigeki Kitamura, Kyoto (JP); Takashi Arisawa, Kyoto (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 14/378,023

(22) PCT Filed: Feb. 20, 2013

(86) PCT No.: PCT/JP2013/054119
§ 371 (c)(1),
(2) Date: Aug. 11, 2014

(87) PCT Pub. No.: WO2013/129200
PCT Pub. Date: Sep. 6, 2013

(65) Prior Publication Data
US 2015/0015819 A1 Jan. 15, 2015

(30) Foreign Application Priority Data

Feb. 27, 2012 (JP) ................................ 2012-040522

(51) Int. Cl.
*G02F 1/136* (2006.01)
*G02F 1/1362* (2006.01)
(Continued)

(52) U.S. Cl.
CPC ........ *G02F 1/136213* (2013.01); *G02F 1/1336* (2013.01); *G02F 1/1368* (2013.01);
(Continued)

(58) Field of Classification Search
CPC .......... G02F 2001/133388; G02F 2001/13629; G02F 2001/136295; G02F 2001/13606; G02F 2001/134354; G02F 2001/136213; G02F 1/136204; G02F 1/136213; G02F 1/136209; G02F 1/133512; G02F 1/136227; G02F 1/134363
USPC ................................................. 349/41–47, 52
See application file for complete search history.

(56) References Cited

U.S. PATENT DOCUMENTS 6,111,626 A  8/2000 Watanabe et al.
7,701,522 B2 * 4/2010 Ota ................... G02F 1/136204
                                                        349/139

(Continued)

FOREIGN PATENT DOCUMENTS

JP     11-119248 A    4/1999
JP   2001-091974 A    4/2001

(Continued)

OTHER PUBLICATIONS

Extended European Search Report, European Patent Application No. 13755634.6, Aug. 10, 2015, 8 pgs.

(Continued)

*Primary Examiner* — Michael Caley
*Assistant Examiner* — Jose M Diaz
(74) *Attorney, Agent, or Firm* — Volpe and Koenig, P.C.

(57) ABSTRACT

A liquid crystal display device includes first and second substrates; a liquid crystal layer placed between the first and second substrates; gate lines; source lines; a first insulation film covering the gate lines and the source lines; a light-shielding film covering the source lines; a second insulation film covering the gate lines, the source lines, and the light-shielding film; a signal electrode disposed on the second insulation film; and a common electrode disposed on the second insulation film, a shield electrode being placed so as to lie between the signal electrode and the source line as seen in a plan view, as well as to lie between the first insulation film and the light-shielding film as seen in a sectional view, and a third insulation film being placed between the shield electrode and the light-shielding film.

6 Claims, 10 Drawing Sheets

(51) Int. Cl.
*G02F 1/1368* (2006.01)
*G02F 1/1333* (2006.01)
*G02F 1/1335* (2006.01)
*G02F 1/1343* (2006.01)

(52) U.S. Cl.
CPC .... *G02F1/133345* (2013.01); *G02F 1/133514* (2013.01); *G02F 1/133528* (2013.01); *G02F 1/134336* (2013.01); *G02F 1/134363* (2013.01); *G02F 1/136209* (2013.01); *G02F 2001/13606* (2013.01); *G02F 2001/136218* (2013.01)

(56) References Cited

U.S. PATENT DOCUMENTS

| | | | |
|---|---|---|---|
| 2002/0159016 A1 | 10/2002 | Nishida et al. | |
| 2002/0163016 A1* | 11/2002 | Shibata | G02F 1/136209 257/200 |
| 2004/0189917 A1 | 9/2004 | Tanaka et al. | |
| 2005/0168665 A1* | 8/2005 | Ina | G02F 1/136213 349/42 |
| 2006/0203151 A1 | 9/2006 | Kim | |
| 2011/0194031 A1* | 8/2011 | Tsubata | G02F 1/136213 348/731 |

FOREIGN PATENT DOCUMENTS

| | | |
|---|---|---|
| JP | 2006-301505 A | 11/2006 |
| JP | 2008-233424 A | 10/2008 |
| JP | 2009-075188 A | 4/2009 |

OTHER PUBLICATIONS

International Search Report, PCT/JP2013/054119, May 7, 2013, 2 pgs.

* cited by examiner

LIQUID CRYSTAL DISPLAY DEVICE COMPRISING VOLTAGE FLUCTUATIONS

TECHNICAL FIELD

The present invention relates to a liquid crystal display device for various usages such as a mobile phone, a digital camera, a portable game machine, or a portable information terminal.

BACKGROUND ART

A liquid crystal display device of in-plane switching type comprises: a pair of opposed substrates; and a liquid crystal layer interposed between the paired substrates, and therein, a gate line, a source line, a TFT (thin-film transistor), a signal electrode, and a common electrode are disposed on one of the paired substrates (array substrate), whereas a color filter is placed on the other of the paired substrates (opposite substrate).

In this liquid crystal display device, the signal electrodes and the common electrodes are disposed alternately on the same plane, and, through the application of voltage to the signal electrode and the common electrode, an electric field is produced between the signal electrode and the common electrode, so that the orientation of liquid crystal molecules in the liquid crystal layer can be controlled by the electric field. An ever-wider viewing angle can be attained by controlling the orientation of the liquid crystal molecules with this transverse electric field.

In addition, high display quality is required in the recent liquid crystal display device, and thus, high luminance is required in addition to the wide viewing angle, in improving the display quality.

As a technology to achieve both of the above objects, there is a black-matrix-on-array (hereafter referred to as "BOA") technique (refer to Japanese Unexamined Patent Publication JP-A 2006-301505). According to the BOA technique, a light-shielding film is formed at the side of the array substrate formed with the signal electrode and so forth so as to cover the gate line and the source line, and therefore, in contrast to a case where the light-shielding film is placed on the opposite substrate, there is no need to provide a margin against misalignment between the substrates that may occur during substrate lamination. Accordingly, the width of the light-shielding film can be reduced, and the pixel aperture ratio can be increased, with consequent attainment of ever-higher luminance. Moreover, since the light-shielding film is present on the array substrate formed with the gate line, the source line, the signal electrode, the common electrode, and so forth, it is possible to shield the lines and the electrodes with the light-shielding film in a wide viewing-angle range, and thereby prevent a lowering of contrast caused by reflection and scattering at the line end and the electrode end.

On the other hand, in the liquid crystal display device of a horizontal electric field system, there is a problem that voltage of the signal electrode is easily fluctuated by fluctuation of voltage of the source line, through coupling capacity generated between the source line and the signal electrode, and this influences the display quality.

In order to address this problem, heretofore it has been customary to place a shield electrode in a region between the source line and the signal electrode to alleviate the influence of voltage fluctuations in the source line on the signal electrode.

However, in the case of placing the shield electrode in a region adjacent to the light-shielding film, light from a light source device is blocked by the shield electrode, and consequently the aperture ratio is decreased, which gives rise to the problem of a possible lowering in pixel luminance level. Furthermore, in the case of placing the shield electrode in contact with the light-shielding film in overlapping relation, since the light-shielding film generally does not lend itself to being utilized as a perfect insulator, it follows that a parasitic capacitance between the source line and the shield electrode is increased, which gives rise to the problem of a possible increase in a load to be applied to the source line.

The invention has been devised in view of the problems as mentioned supra, and accordingly an object of the invention is to provide a liquid crystal display device capable of suppressing a decline in pixel aperture ratio and an increase in a load applied to a source line while alleviating the influence of voltage fluctuations in the source line on a signal electrode.

SUMMARY OF INVENTION

A liquid crystal display device pursuant to the invention comprises: a first substrate and a second substrate disposed so that a main surface of the first substrate and a main surface of the second substrate are opposed to each other; a liquid crystal layer placed between the first substrate and the second substrate; a plurality of gate lines disposed on the main surface of the second substrate; a plurality of source lines disposed on the main surface of the second substrate so as to be intersected by the plurality of gate lines; a first insulation film placed on the main surface of the second substrate so as to cover the plurality of gate lines and the plurality of source lines; a light-shielding film placed on the first insulation film so as to cover the plurality of source lines; a second insulation film placed on the first insulation film so as to cover the plurality of gate lines, the plurality of source lines, and the light-shielding film; a signal electrode disposed on the second insulation film; and a common electrode disposed on the second insulation film, for forming an electric field between the common electrode and the signal electrode, a shield electrode being placed so as to lie between the signal electrode located in a region surrounded by the plurality of gate lines and the plurality of source lines, and the source line as seen in a plan view, as well as to lie between the first insulation film and the light-shielding film as seen in a sectional view, and a third insulation film being placed between the shield electrode and the light-shielding film.

DESCRIPTION OF EMBODIMENTS

First Embodiment

Figure 1:
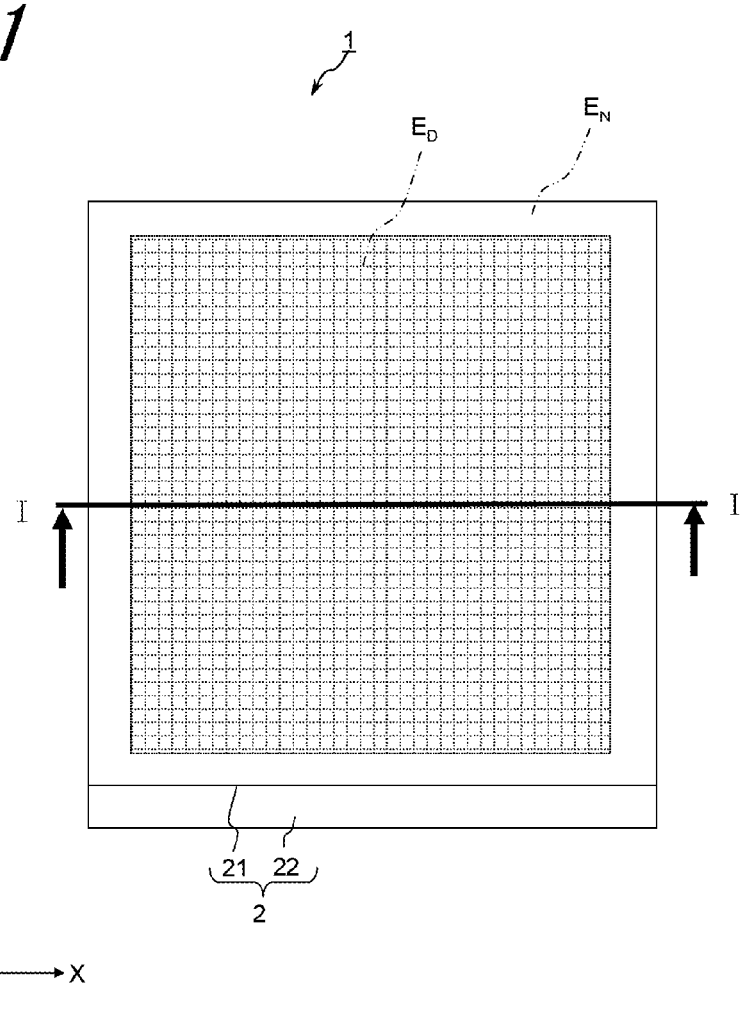
FIG. 1 is a plan view showing a liquid crystal display device in accordance with a first embodiment of the invention.

A liquid crystal display device 1 in accordance with a first embodiment of the invention will be described with reference to FIGS. 1 to 5.

The liquid crystal display device 1 includes a liquid crystal panel 2, a light source device 3 which emits light toward the liquid crystal panel 2, a first polarizing plate 4 disposed on the liquid crystal panel 2, and a second polarizing plate 5 disposed between the liquid crystal panel 2 and the light source device 3.

In the liquid crystal panel 2, a first substrate 21 and a second substrate 22 are disposed so as to face each other, a liquid crystal layer 23 is placed between the first substrate 21 and the second substrate 22, and a sealing material 24 which bonds the first substrate 21 and the second substrate 22 is disposed so as to surround the liquid crystal layer 23.

The first substrate 21 has a first main surface 21a having a display region $E_D$ and a non-display region $E_N$ located outside of the display region $E_D$, and a second main surface 21b located opposite the first main surface 21a. The first substrate 21 is made of, for example, glass or plastic.

A color filter 211 is placed on the second main surface 21b of the first substrate 21.

The color filter 211 has the function of allowing, out of visible light, only light of a predetermined wavelength to pass therethrough. A plurality of color filters 211 are disposed on the second main surface 21b of the first substrate 21 on a pixel-by-pixel basis. The color filters 211 have colors of red, green, and blue. Moreover, the color of the color filter 211 is not limited to the foregoing, and therefore, for example, a yellow color filter 211 or a white color filter 211 may be placed. For example, a colorant- or pigment-added resin may be adopted for use as the material used for the color filter 211.

Moreover, a planarizing film, an alignment film and so forth (not shown in the drawings) are placed on the color filter 211.

The second substrate 22 has a first main surface 22a facing the second main surface 21b of the first substrate 21, and a second main surface 22b located opposite the first main surface 22a. The second substrate 22 can be made of a material similar to the material used for the first substrate 21.

At first, referring to FIGS. 3 and 4, each of members placed on the first main surface 22a of the second substrate 22 overlapping the display region $E_D$ will be explained.

A plurality of gate lines 221 and auxiliary capacitance lines 222 are disposed on the first main surface 22a of the second substrate 22, and also, a gate insulation film 223 is placed so as to cover the plural gate lines 221 and auxiliary capacitance lines 222. A plurality of source lines 224 are disposed on the gate insulation film 223. Moreover, a first interlayer insulation film 225 is placed on the gate insulation film 223 so as to cover the plural source lines 224. Shield electrodes S are placed on the first interlayer insulation film 225. Furthermore, a second interlayer insulation film 226 is placed on the first interlayer insulation film 225 so as to cover the shield electrodes S. A light-shielding film BM is placed on the second interlayer insulation film 226. In addition, a planarizing film 227 is placed on the first interlayer insulation film 226 so as to cover the light-shielding film BM, and, a common electrode 228 and a signal electrode 229 are disposed on the planarizing film 227.

The gate line 221 has the function of applying a gate voltage fed from a driving IC (not shown) to a thin-film transistor TFT. As shown in FIG. 3, the gate line 221 lies on the first main surface 22a of the second substrate 22 so as to extend in an X direction. Moreover, the plural gate lines 221 are disposed along a Y direction. The gate line 221 is made of a material having electrical conductivity, for example, aluminum, molybdenum, titanium, neodymium, chromium, copper, or an alloy containing such substances.

In addition, the gate lines 221 are formed by the method described below, for example.

The first step is to form an electrically-conductive film on the first main surface 22a of the second substrate 22 by means of sputtering, vapor deposition, or chemical vapor deposition. A photosensitive resin is coated on the surface of the electrically-conductive film, and the photosensitive resin coating is subjected to exposure process and developing process to define a pattern of predetermined shape in the photosensitive resin. Subsequently, the electrically-conductive film is etched into a predetermined shape with an etching solution, and whereafter the photosensitive resin coating is removed. Thus, the gate line 221 can be formed by following these film-forming and patterning procedures.

The auxiliary capacitance line 222 is placed on the first main surface 22a of the second substrate 22. The auxiliary capacitance line 222 and the gate line 221 are located on the same plane. As shown in FIG. 3, the auxiliary capacitance line 222 extends in the X direction. Moreover, the auxiliary capacitance line 222 may be made of a material similar to the material used for the gate line 221.

Although, in the present embodiment, the auxiliary capacitance line 222 and the gate line 221 are formed on the same plane, this does not suggest any limitation. That is, the auxiliary capacitance line 222 may be formed on a layer different from the layer bearing the gate line 221.

The gate insulation film 223 is placed on the first main surface 22a so as to cover the gate line 221 and the auxiliary capacitance line 222. The gate insulation film 223 is made of a material having insulating properties such as silicon nitride or silicon oxide. The gate insulation film 223 can be formed on the first main surface 22a of the second substrate 22 by means of sputtering, vapor deposition, or chemical vapor deposition as described above.

The source line 224 has the function of applying a signal voltage fed from the driving IC to the signal electrode 229 through the thin-film transistor TFT. As shown in FIG. 3, the plural source lines 224 extend in the Y direction. Moreover, the plural source lines 224 are disposed along the X direction. The source line 224 may be made of a material similar to the material used for the gate line 221. The source line 224 can be formed by a method similar to the method for forming the gate line 221. Although, in this embodiment, the source line 224 is formed in a linear shape, it may be made to have a bend.

The thin-film transistor TFT comprises: a semiconductor layer made of amorphous silicon, polysilicon, an oxide semiconductor, or the like; a source electrode placed on the semiconductor layer and connected to the source line 224; and a drain electrode. Moreover, the drain electrode of the thin-film transistor TFT is connected, through a drain line D and a contact hole C, to the signal electrode 229.

In the thin-film transistor TFT, the resistance of the semiconductor layer between the source electrode and the drain electrode is varied according to a gate voltage applied to the semiconductor layer via the gate line 221, thereby allowing control of writing or non-writing of an image signal into the signal electrode 229.

The first interlayer insulation film 225 is placed on the gate insulation film 223 so as to cover the source line 224. The first interlayer insulation film 225 may be made of a material similar to the material used for the gate insulation film 223.

The shield electrode S has the function of shielding an electric field arising from a voltage applied to the source line 224. In FIG. 3, a shield-electrode S formation region is indicated by oblique lines (solid lines) (this holds true also for FIGS. 6 and 8).

The shield electrode S is placed on the first interlayer insulation film 225. Moreover, as shown in FIG. 3, part of the shield electrode S extends in the Y direction so as to be adjacent to the source line 224. Although, in this embodiment, the extending part of the shield electrode S is formed in a linear shape, it may be made to have a bend.

Moreover, the extending part of the shield electrode S is located between the source line 224 and the signal electrode 229 as seen in a plan view. Furthermore, the shield electrode S is located in a light-shielding film BM formation region. It is sufficient that the shield electrode S is at least partly located in the light-shielding film BM formation region.

The shield electrode S of the present embodiment is connected to the auxiliary capacitance line 222 through the contact hole C. Note that the shield electrode S may be connected to the common electrode 228 instead of the auxiliary capacitance line 222. In another alternative, the shield electrode S may be connected to both of the common electrode 228 and the auxiliary capacitance line 222. Moreover, the shield electrode S may be connected to ground potential, and may be in a floating state so long as its surface area can be secured adequately.

The shield electrode S is made of a material having electrical conductivity. Examples of the material used for the shield electrode S include light-transmittable materials such as ITO (Indium Tin Oxide), IZO (Indium Zinc Oxide), ATO (Antimony Tin Oxide), AZO (Al-Doped Zinc Oxide), tin oxide, and zinc oxide, and non-transmittable materials such as aluminum, molybdenum, titanium, neodymium, chromium, copper, and an alloy containing such substances. However, the material used for the shield electrode S is not limited to them so long as it exhibits electrical conductivity.

The second interlayer insulation film 226 has the function of providing electrical isolation between the shield electrode S and the light-shielding film BM. The second interlayer insulation film 226 is placed on the first interlayer insulation film 225 so as to cover the shield electrode S. The second interlayer insulation film 226 may be made of a material similar to the material used for the gate insulation film 223.

The light-shielding film BM has the function of blocking light. The light-shielding film BM is placed on the second interlayer insulation film 226 and lies so as to overlap part of the gate lines 221, the auxiliary capacitance lines 222, the source lines 224, and the common electrodes 228. Moreover, the light-shielding film BM is formed so as to cover the shield electrode S. Note that the light-shielding film BM may be formed so as to cover at least part of the shield electrode S.

Figure 3:
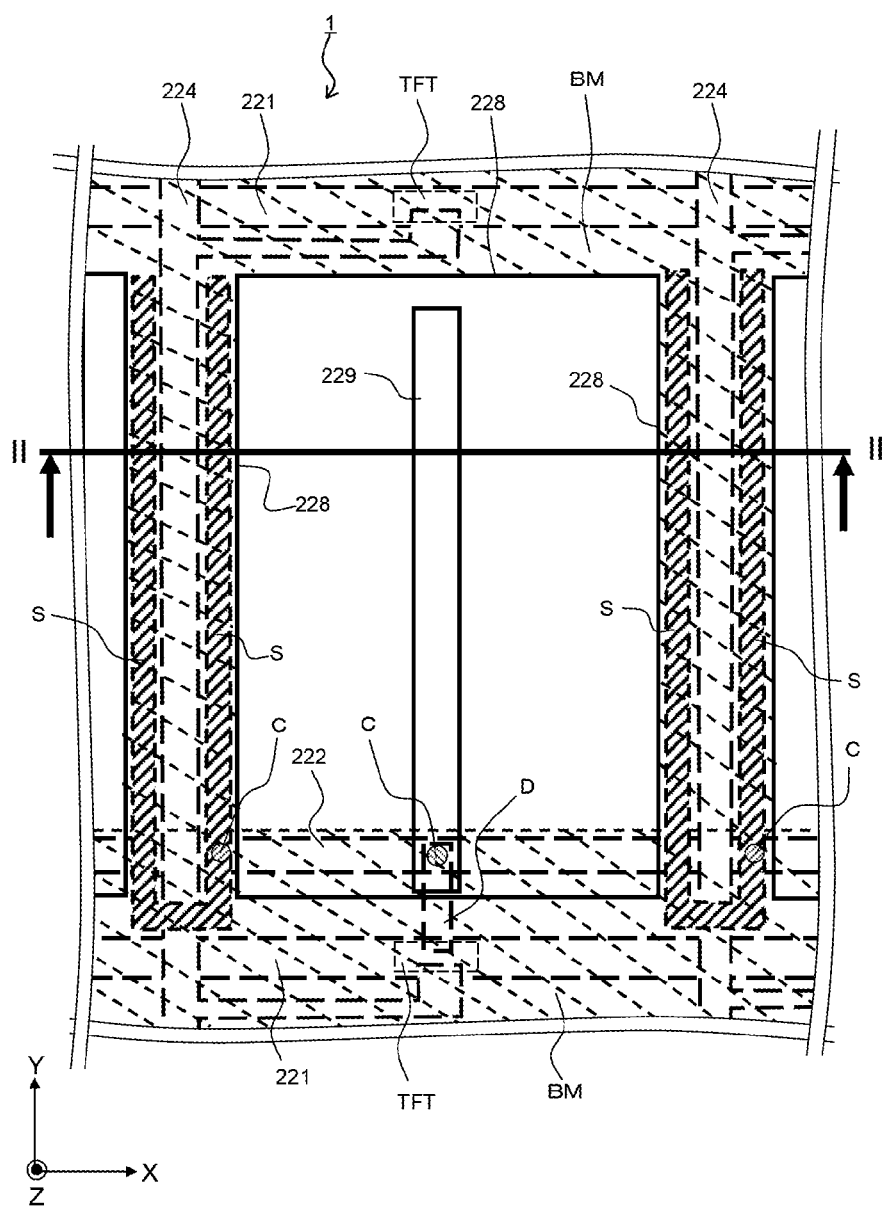
FIG. 3 is a plan view showing lines, electrodes, and a light-shielding film disposed on a second substrate for pixels.
Figure 4:
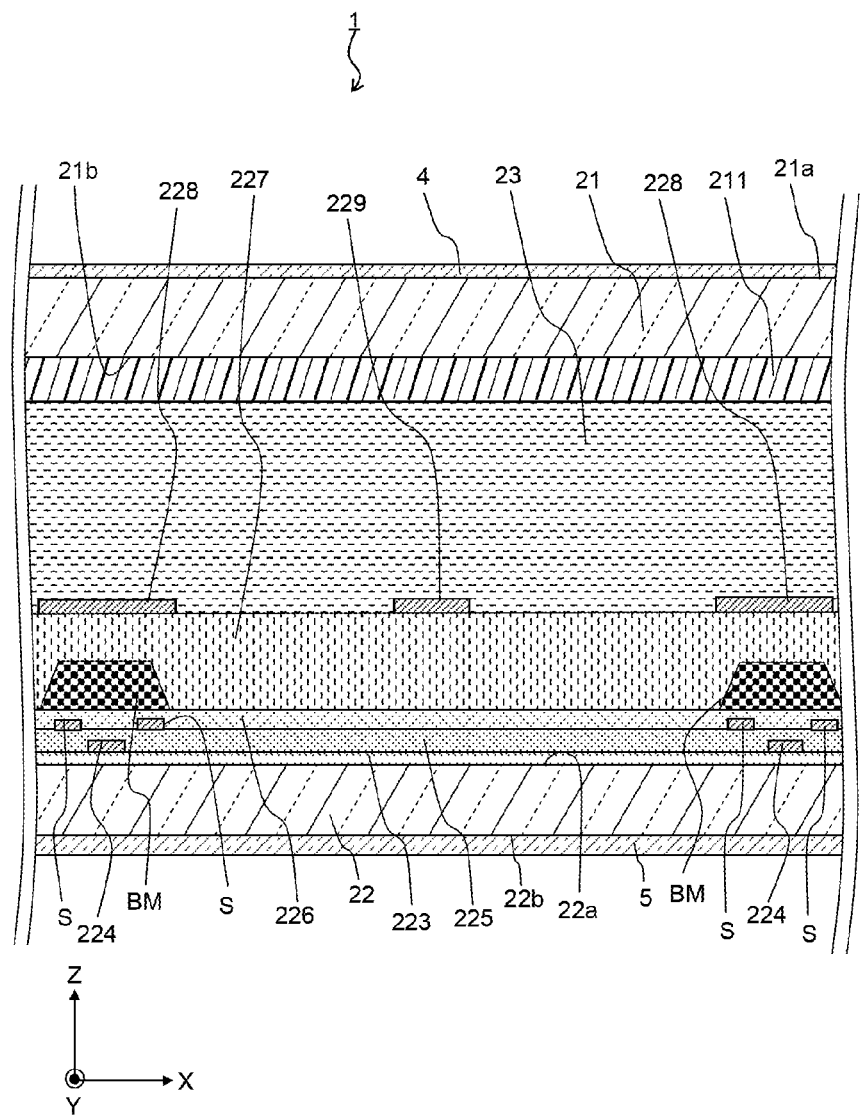
FIG. 4 is a sectional view of the liquid crystal display device taken along the line II-II shown in FIG. 3.
Figure 6:
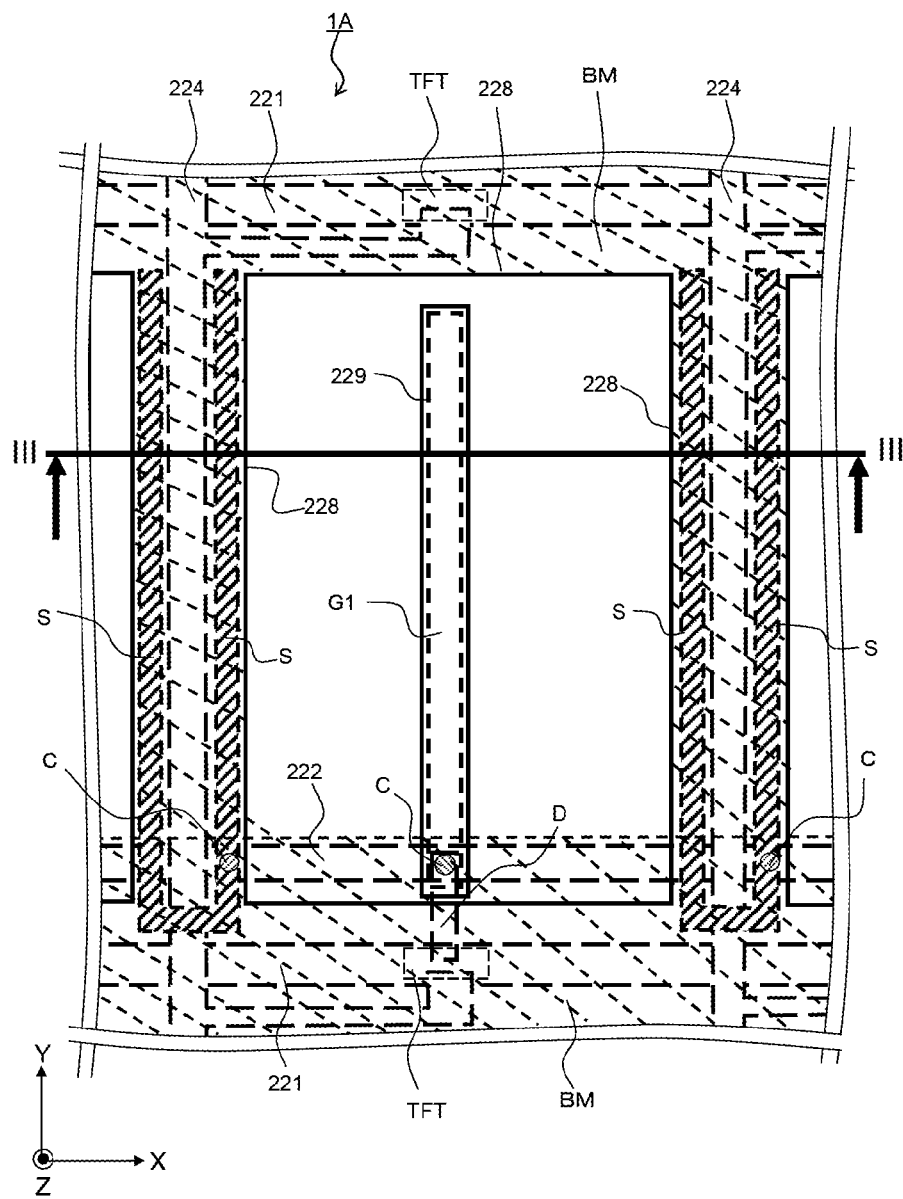
FIG. 6 is a plan view showing the main part of the liquid crystal display device in accordance with a second embodiment of the invention.
Figure 8:
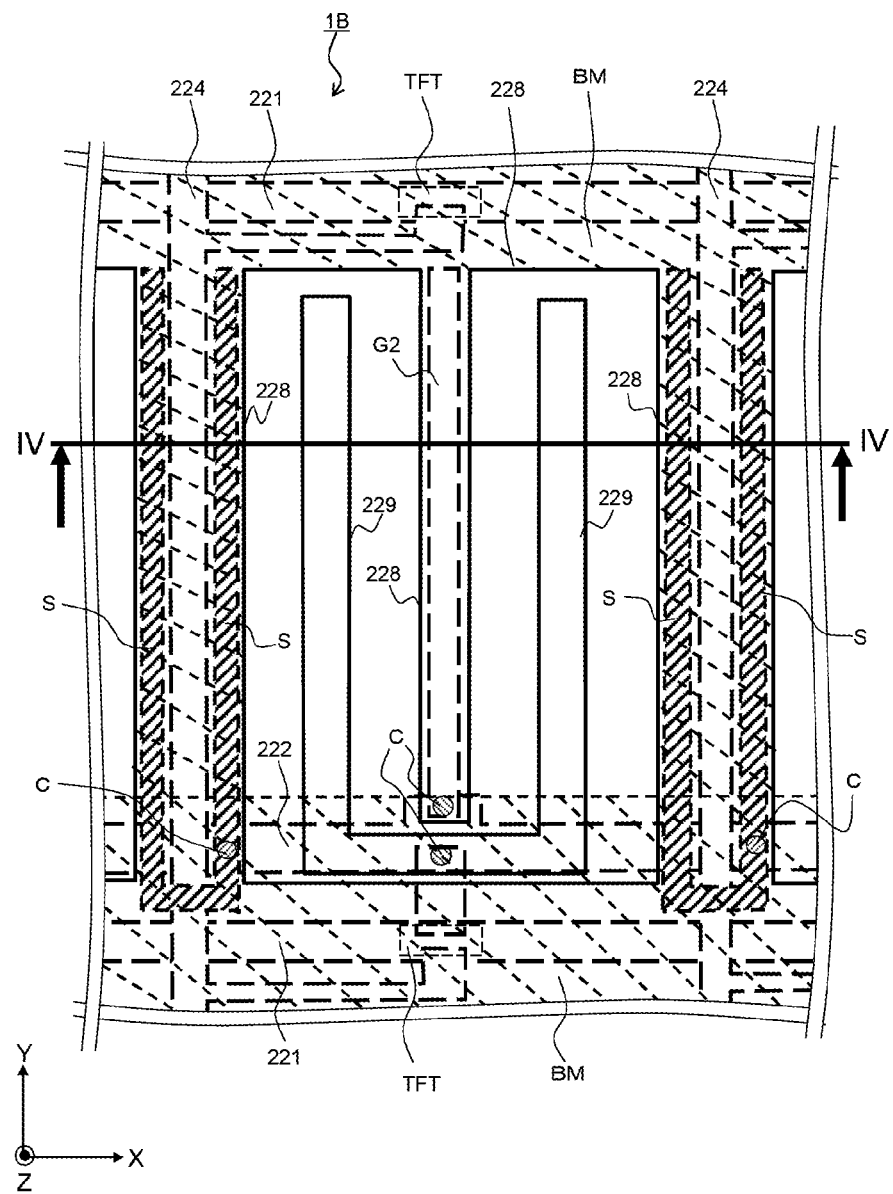
FIG. 8 is a plan view showing the main part of the liquid crystal display device in accordance with a third embodiment of the invention.

In FIG. 3, the light-shielding film BM formation region is indicated by oblique lines (broken lines) (this holds true also for FIGS. 6 and 8).

Since the light-shielding film BM is formed at the side of the second substrate 22 to cover the gate line 221, the source line 224, and the auxiliary capacitance line 222, in contrast to a case where the light-shielding film BM is formed at the side of the first substrate 21, it is possible to shield the gate line 221, the auxiliary capacitance line 222, and the source line 224 from light with accuracy.

Examples of the material used for the light-shielding film BM include: a resin added with a dye or pigments of a color exhibiting a high light-blocking effect (black color, for example); a metal such as chromium; and an alloy.

The planarizing film 227 is placed on the second interlayer insulation film 226 so as to cover the light-shielding film BM. The planarizing film 227 is made of an organic material, for example, acrylic resin, epoxy resin, or polyimide resin. The film thickness of the planarizing film 227 is set to fall in a range from 1 μm to 5 μm, for example. From the viewpoint of reduction in parasitic capacitance, it is desirable to increase the film thickness of the planarizing film 227.

The common electrode 228 has the function of producing an electric field between the common electrode 228 and the signal electrode 229 under a voltage applied thereto by the driving IC. The common electrode 228 is placed on the planarizing film 227. The common electrode 228 is made of a light-transmittable material having electrical conductivity, for example, ITO, IZO, ATO, AZO, tin oxide, zinc oxide, or an electrically-conductive high polymer.

The signal electrode 229 has the function of producing an electric field between the signal electrode 229 and the common electrode 228 under a voltage applied thereto by the driving IC. A plurality of signal electrodes 229 are placed on the planarizing film 227, and they are disposed along the X direction. Moreover, the common electrodes 228 are positioned on both sides of the signal electrode 229 in the X direction. That is, the signal electrodes 229 and the common electrodes 228 are disposed alternately in the X direction. Although, in this embodiment, the signal electrode 229 is formed in a linear shape, it may be made to have a bend. The signal electrode 229 may be made of a material similar to the material used for the common electrode 228.

The width of the signal electrode 229 is set to fall in a range of from 2 μm to 5 μm, for example. The distance between the signal electrode 229 and the common electrode 228 is set to fall in a range of from 5 μm to 20 μm, for example.

In the liquid crystal display device 1, since the shield electrode S is located between the signal electrode 229 and the source line 224 as seen in a plan view, the shield electrode S can block an electric field generated from the source line 224, and consequently the influence of voltage fluctuations in the source line 224 on the signal electrode 229 can be alleviated.

In addition, since the shield electrode S is located within the light-shielding film BM formation region, it is possible to reduce blocking of light from the light source device 3 due to the shield electrode S, and thereby suppress a decline in pixel aperture ratio. Moreover, by making the shield electrode S from a light-transmittable material, it is also possible to reduce blocking of light due to that part of the shield electrode S which lies outside of the light-shielding film BM formation region.

Moreover, in the liquid crystal display device 1, the second interlayer insulation film 226 is placed between the shield electrode S and the light-shielding film BM as seen in a sectional view. Since the second interlayer insulation film 226 provides electrical isolation between the shield electrode S and the light-shielding film BM, even if the light-shielding film BM does not serve as a perfect insulator, it is possible to avoid an increase in the load put on the source line 224 due to an increase in the parasitic capacitance between the source line 224 and the shield electrode S.

Figure 5:
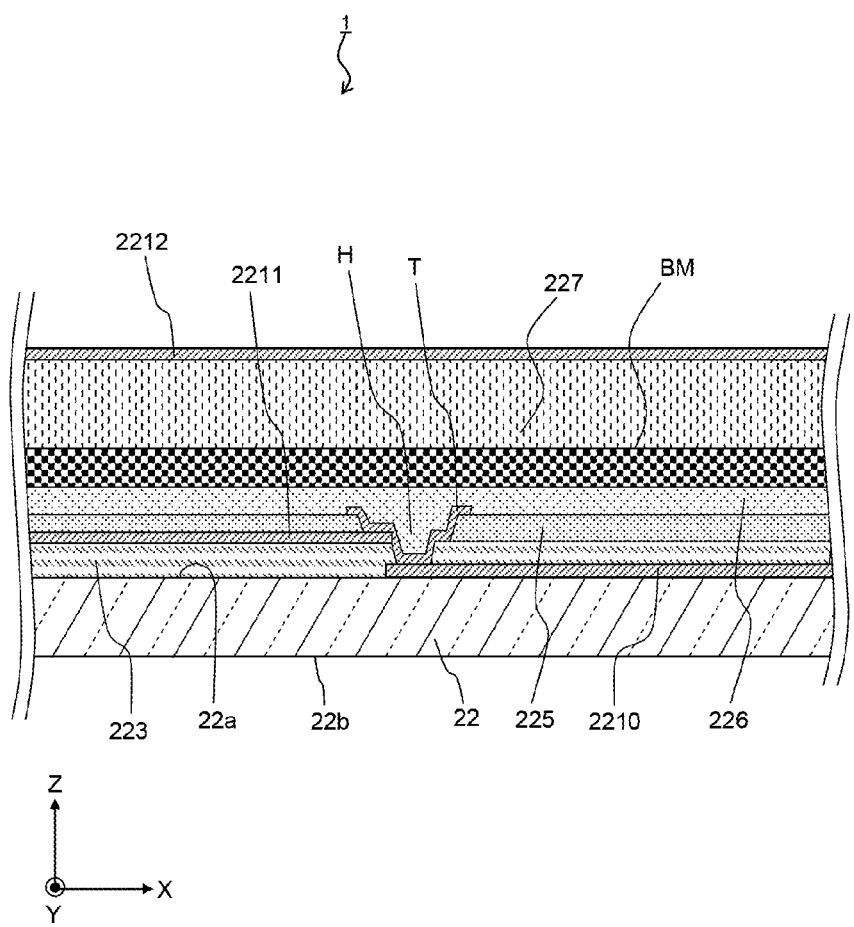
FIG. 5 is a sectional view showing the lines, insulation films, contact holes, and so forth on the second substrate in a non-display region.

Next, referring to FIG. 5, each of members placed on the first main surface 22a of the second substrate 22 overlapping the non-display region $E_N$ will be explained. FIG. 5 is a sectional view showing part of the non-display region $E_N$. Moreover, descriptions as to the members that have already been described will be omitted.

A first wiring conductor 2210 is placed on the first main surface 22a of the second substrate 22 overlapping the non-display region $E_N$. Moreover, the gate insulation film 223 is placed on the first main surface 22a of the second substrate 22. A second wiring conductor 2211 is placed on the gate insulation film 223. Moreover, the first interlayer insulation film 225 is placed on the gate insulation film 223 so as to cover a part of the second wiring conductor 2211. A through hole H is formed in the gate insulation film 223 and the first interlayer insulation film 225 for rendering the first wiring conductor 2210 and the second wiring conductor 2211 exposed. A connection conductor T is placed inside the through hole H. Moreover, the second interlayer insulation film 226 is placed on the first interlayer insulation film 225 so as to cover the connection conductor T. The light-shielding film BM is placed on the second interlayer insulation film 226 so as to overlap the through hole H. In addition, the planarizing film 227 is placed on the light-shielding film BM, and, a third wiring conductor 2212 is placed on the planarizing film 227.

The first wiring conductor 2210 is placed on the first main surface 22a of the second substrate 22. The first wiring conductor 2210 is connected to the gate line 221 or the auxiliary capacitance line 222 and so forth. The first wiring conductor 2210 may be made of a material similar to the material used for the gate line 221.

The through hole H is formed in the gate insulation film 223 and the first interlayer insulation film 225. The through hole H is located above the first wiring conductor 2210 and the second wiring conductor 2211, and, in the presence of the through hole H, part of the first wiring conductor 2210, as well as part of the second wiring conductor 2211, is exposed from the gate insulation film 223 and the first interlayer insulation film 225.

The second wiring conductor 2211 is placed on the gate insulation film 223 and lies on the same plane as the source line 224. Moreover, the second wiring conductor 2211 is connected to the driving IC and so forth. The second wiring conductor 2211 may be made of a material similar to the material used for the source line 224.

The connection conductor T has the function of providing connection between the first wiring conductor 2210 and the second wiring conductor 2211. The connection conductor T is placed in the through hole H, and is connected to the first wiring conductor 2210 within the through hole H. Moreover, part of the connection conductor T is placed outside of the through hole H and lies on the first interlayer insulation film 225. Furthermore, the connection conductor T is also placed in part on the second wiring conductor 2211, and, the connection conductor T is connected, at this part, to the second wiring conductor 2211. The connection conductor T is made of the same material as that used for the shield electrode S.

In the liquid crystal display device 1, the through hole H in which the connection conductor T is placed is located within the light-shielding film BM formation region. That is, the first wiring conductor 2210 and the second wiring conductor 2211 are connected to each other by the connection conductor T within the light-shielding film BM formation region. Thus, the connection conductor T located inside the through hole H, the first wiring conductor 2210, and the second wiring conductor 2211 are not exposed from the light-shielding film BM, wherefore it is possible to suppress deterioration in image quality in the display region $E_D$ due to reflection of extraneous light by the connection conductor T, the first wiring conductor 2210, and the second wiring conductor 2211.

Moreover, in the liquid crystal display device 1, since the connection conductor T and the shield electrode S are made of the same material, it is possible to form both of them in the same film-forming and patterning process, and thereby simplify the manufacturing operation.

The third wiring conductor 2212 is placed on the planarizing film 227 so as to lie on the same plane as the signal electrode 229 and the common electrode 228. The third wiring conductor 2212 is connected to the second wiring conductor 2211 and so forth at an enclosure opening or at a location outside of the enclosure opening. The third wiring conductor 2212 may be made of a material similar to the material used for the common electrode 228.

Figure 2:
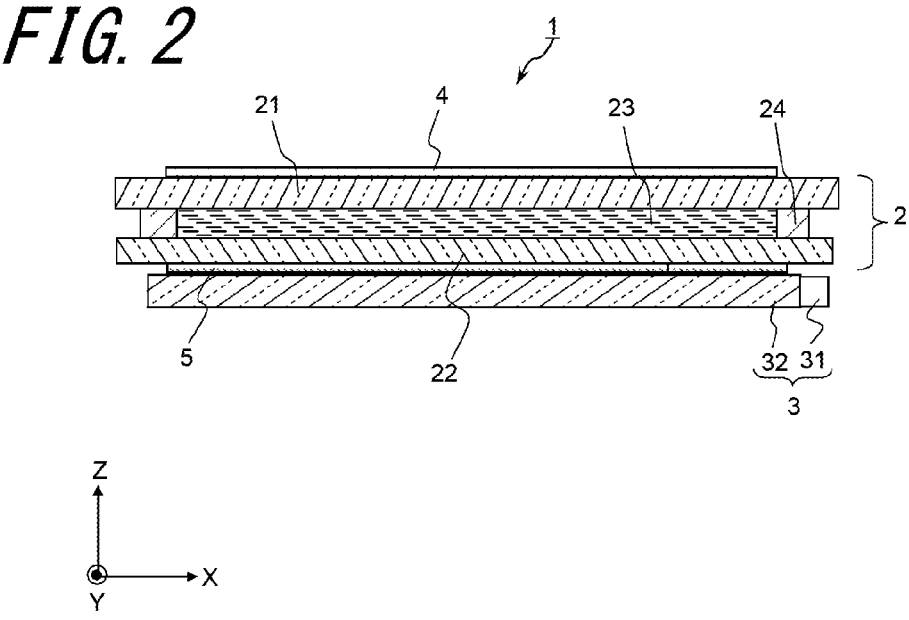
FIG. 2 is a sectional view taken along the line I-I shown in FIG. 1.

Next, referring to FIGS. 2 and 4, the liquid crystal layer 23, the seal portion 24, the light source device 3, the first polarizing plate 24, and the second polarizing plate 25 will be described.

The liquid crystal layer 23 is placed between the first substrate 21 and the second substrate 22. The liquid crystal layer 23 contains liquid crystal molecules such as nematic liquid crystal molecules.

In the liquid crystal display device 1, through the application of a voltage to the signal electrode 229 and the common electrode 228 which are disposed on the same plane, an electric field is produced between the signal electrode 229 and the common electrode 228, and, the orientation of the liquid crystal molecules in the liquid crystal layer 23 is controlled by the electric field.

The seal material 24 has the function of bonding the first substrate 21 with the second substrate 22. The seal material 24 is placed between the first substrate 21 and the second substrate 22 so as to surround the display region $E_D$ as seen in a plan view. The seal material 24 is made of epoxy resin or the like.

The light source device 3 has the function of emitting light toward the display region $E_D$ of the liquid crystal panel 2. The light source device 3 includes a light source 31 and a light guiding plate 32. Although, in the light source device 3 of the present embodiment, a point light source such as LED is adopted for use as the light source 31, a line light source such as a cold cathode tube can be adopted.

The first polarizing plate 4 has the function of permitting transmission of light corresponding to a predetermined vibrating direction in a selective manner. The first polarizing plate 4 is placed so as to face the first main surface 21a of the first substrate 21 of the liquid crystal panel 2.

The second polarizing plate 5 has the function of permitting transmission of light corresponding to a predetermined vibrating direction in a selective manner. The second polarizing plate 5 is placed so as to face the second main surface 22b of the second substrate 22.

Second Embodiment

Figure 7:
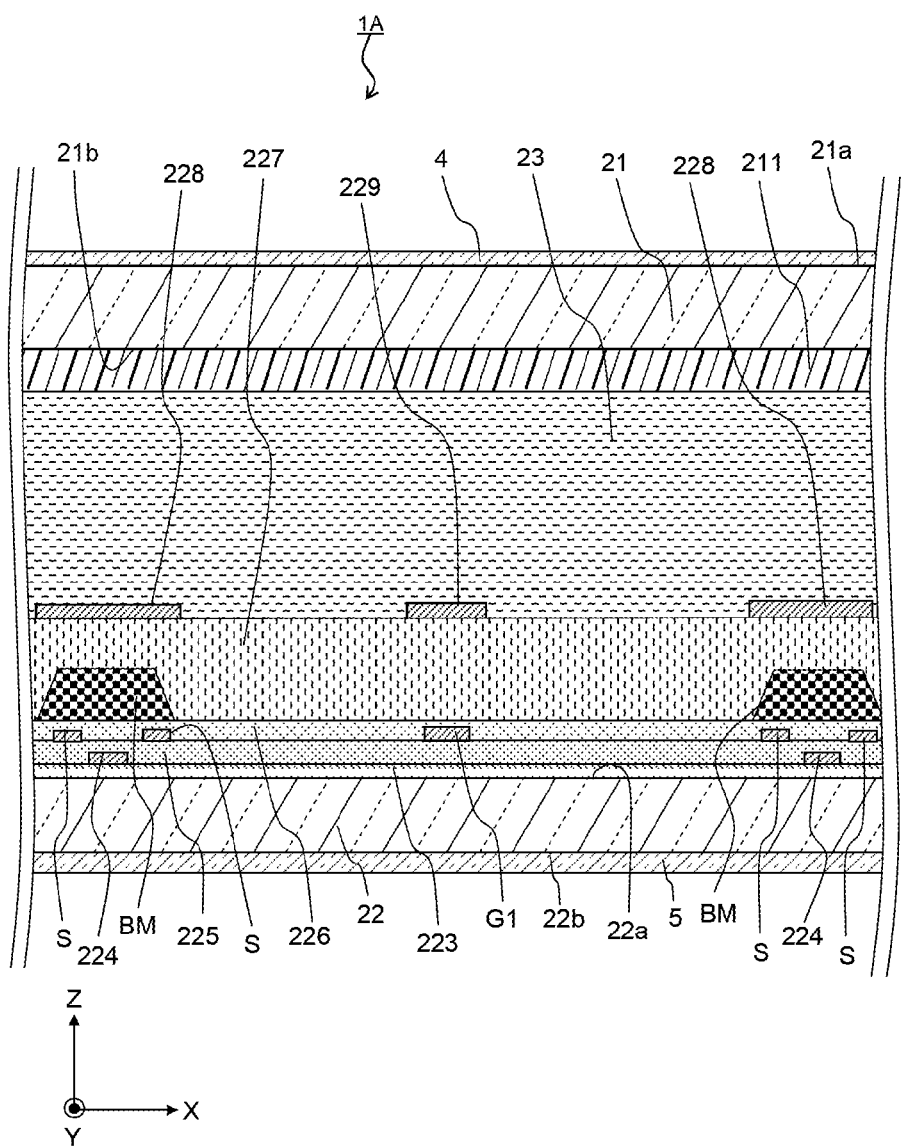
FIG. 7 is a sectional view of the liquid crystal display device taken along the line III-III shown in FIG. 6.

FIGS. 6 and 7 are views showing the main part of a liquid crystal display device 1A in accordance with a second embodiment.

The liquid crystal display device 1A differs from the liquid crystal display device 1 of the first embodiment in that a first conductive film G1 is disposed so as to overlap the signal electrode 229 and is electrically connected with the signal electrode 229.

The first conductive film G1 is placed on the first interlayer insulation film 225 and lies on the same plane as the shield electrode S. Moreover, the first conductive film G1 is located so as to overlap a signal-electrode 229 formation region. Furthermore, the first conductive film G1 and the shield electrode S are made of the same material.

The first conductive film G1 is electrically connected to the signal electrode 229, and more specifically, the signal electrode 229 and the first conductive film G1 are connected to each other through the contact hole C.

In the liquid crystal display device 1A, the first conductive film G1 is formed in the signal-electrode 229 formation region so as to underlie the signal electrode 229 as seen in a plan view. Thus, a line of electric force arises so as to travel from the first conductive film G1 underlying the signal electrode 229 toward the common electrodes 228 positioned on both sides of the signal electrode 229. By virtue of the line of electric force, even if the display region $E_D$ is pressed by, for example, human's finger in a white display mode, since irregularities in the orientation of the liquid crystal molecules in a region between the signal electrode 229 and the common electrode 228 are lessened, it is possible to suppress deterioration in display quality caused by occurrence of reverse twisted domain.

Moreover, in the liquid crystal display device 1A, the first conductive film G1 and the shield electrode S are made of the same material. This makes it possible to form both of the first conductive film G1 and the shield electrode S in the same film-forming and patterning process, and thereby simplify the manufacturing operation for the liquid crystal display device 1A.

Third Embodiment

Figure 9:
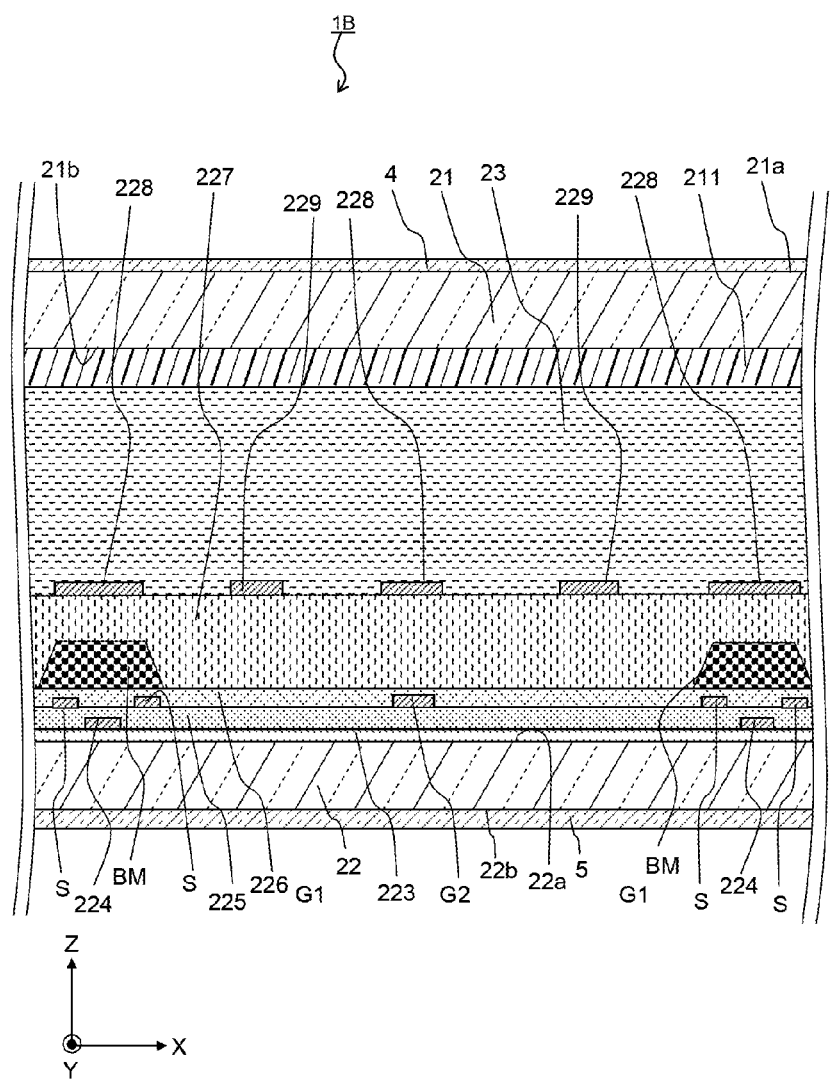
FIG. 9 is a sectional view of the liquid crystal display device taken along the line IV-IV shown in FIG. 8.

FIGS. 8 and 9 are views showing the main part of a liquid crystal display device 1B in accordance with a third embodiment.

The points of difference of the liquid crystal display device 1B from the liquid crystal display device 1 of the first embodiment are as follows.

In the liquid crystal display device 1B, a plurality of signal electrodes 229 are formed for a single pixel, and the common electrodes 228 are positioned on both sides of each of the signal electrodes 229 in the X direction to achieve further increase in the number of pixel divisions.

Moreover, in the liquid crystal display device 1B, a second conductive film G2 is placed on the first interlayer insulation film 225.

The second conductive film G2 is located so as to overlap a common-electrode 228 formation region and is electrically connected with the common electrode 228. More specifically, the common electrode 228 and the second conductive film G2 are connected to each other through the contact hole C. Moreover, the second conductive film G2 may be connected to the auxiliary capacitance line 222 through the contact hole C.

The shield electrode S is connected to the common electrode 228 through the contact hole C. Moreover, the shield electrode S may be connected to the auxiliary capacitance line 222 through the contact hole C.

In the liquid crystal display device 1C, the second conductive film G2 is formed in the common-electrode 228 formation region so as to underlie the common electrode 228 as seen in a plan view. Thus, a line of electric force arises so as to travel from the second conductive film G2 underlying the common electrode 228 toward the signal electrodes 229 positioned on both sides of the common electrode 228. By virtue of the line of electric force, even if the display region $E_D$ is pressed by, for example, human's finger in a white display mode, since irregularities in the orientation of the liquid crystal molecules in a region between the signal electrode 229 and the common electrode 228 are lessened, it is possible to suppress deterioration in display quality caused by occurrence of reverse twisted domain.

Moreover, the shield electrode S, being connected to the common electrode 228, is capable of serving as the second conductive film G2, wherefore an electric field can be produced between the signal electrode 229 and the shield electrode S, and consequently, the liquid crystal molecules of the liquid crystal layer 23 can be controlled by the electric field, and the number of constituent components of the liquid crystal display device 1C can be reduced.

Moreover, in the liquid crystal display device 1C, the second conductive film G2 and the shield electrode S are made of the same material. This makes it possible to form both of the second conductive film G2 and the shield electrode S in the same film-forming and patterning process, and thereby simplify the manufacturing operation for the liquid crystal display device 1C.

Fourth Embodiment

Figure 10:
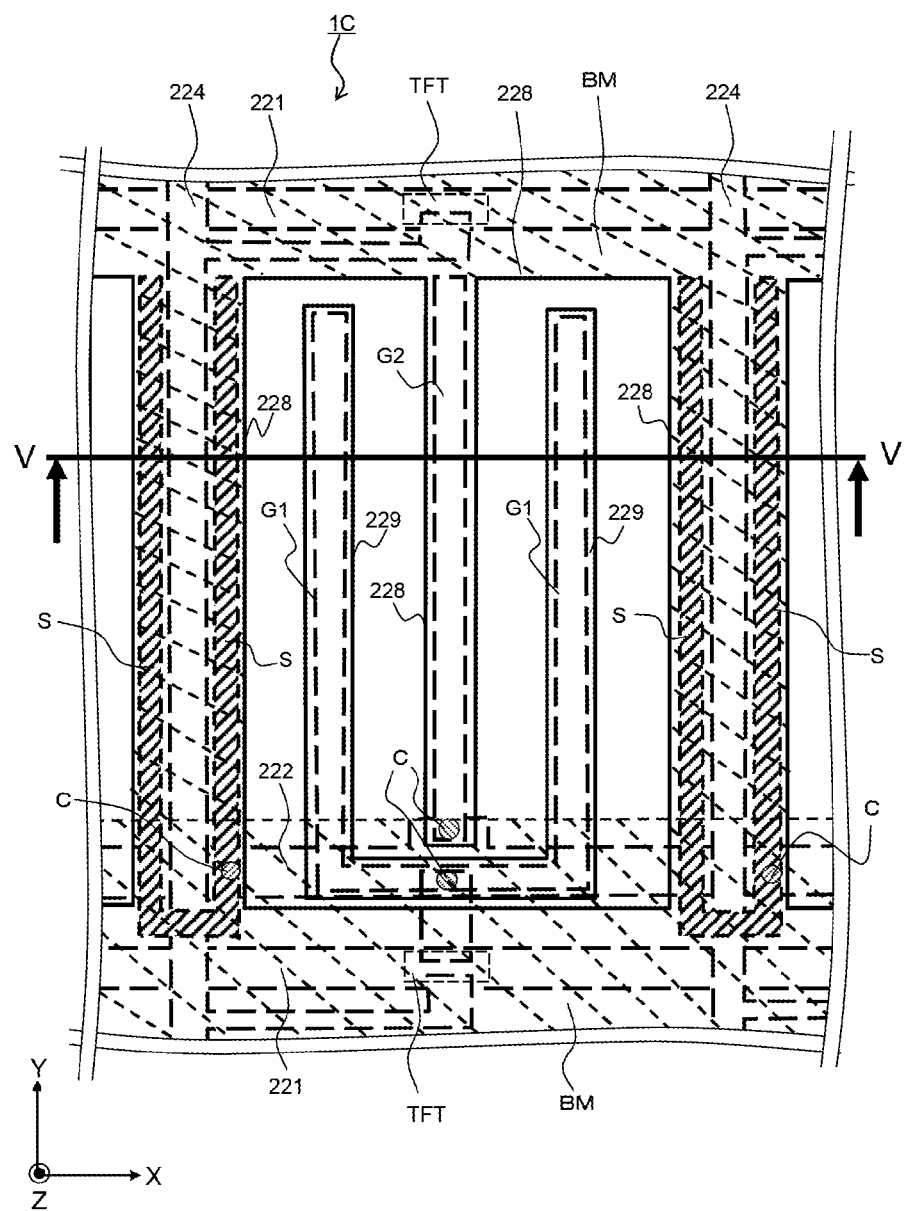
FIG. 10 is a plan view showing the main part of the liquid crystal display device in accordance with a fourth embodiment of the invention.
Figure 11:
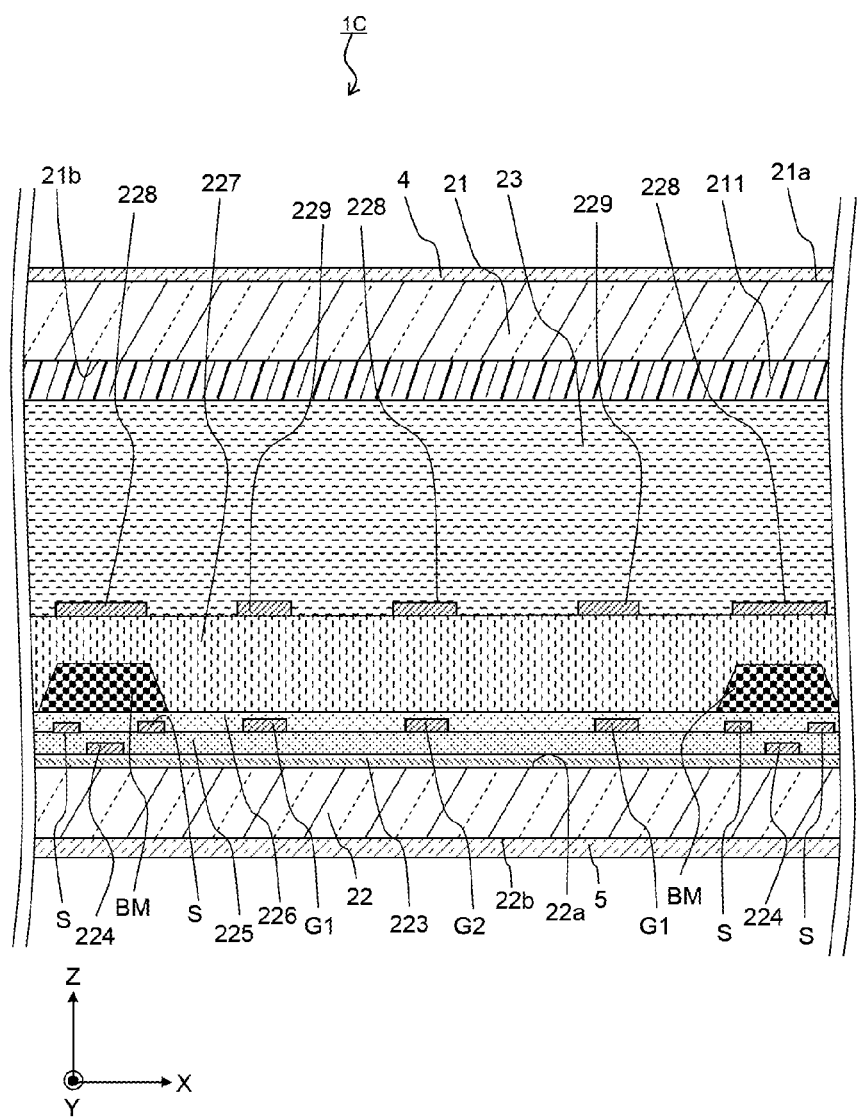
FIG. 11 is a sectional view of the liquid crystal display device taken along the line V-V shown in FIG. 10.

FIGS. 10 and 11 are views showing the main part of a liquid crystal display device 1C in accordance with a fourth embodiment.

The points of difference of the liquid crystal display device 1C from the liquid crystal display device 1 of the first embodiment are as follows.

In the liquid crystal display device 1C, a plurality of signal electrodes 229 are formed for a single pixel, and the common electrodes 228 are positioned on both sides of each of the signal electrodes 229 in the X direction to achieve further increase in the number of pixel divisions.

Moreover, in the liquid crystal display device 1C, the first conductive film G1 and the second conductive film G2 are placed on the first interlayer insulation film 225.

The first conductive film G1 is located so as to overlap the signal-electrode 229 formation region and is electrically connected with the signal electrode 229. More specifically, the signal electrode 229 and the first conductive film G1 are connected to each other through the contact hole C.

The second conductive film G2 is located so as to overlap the common-electrode 228 formation region and is electrically connected with the common electrode 228. More specifically, the common electrode 228 and the second conductive film G2 are connected to each other through the contact hole C. Moreover, the second conductive film G2 may be connected to the auxiliary capacitance line 222 through the contact hole C.

The shield electrode S is connected to the common electrode 228 through the contact hole C. Moreover, the shield electrode S may be connected to the auxiliary capacitance line 222 through the contact hole C.

In the liquid crystal display device 1C, the first conductive film G1 is placed on the first interlayer insulation film 225. Thus, a line of electric force arises so as to travel from the first conductive film G1 toward the common electrodes 228 positioned on both sides of the signal electrode 229. By virtue of the line of electric force, even if the display region $E_D$ is pressed by, for example, human's finger in a white display mode, since irregularities in the orientation of the liquid crystal molecules in a region between the signal electrode 229 and the common electrode 228 are lessened, it is possible to suppress deterioration in display quality caused by occurrence of reverse twisted domain.

Moreover, the second conductive film G2, which is formed on the same plane as the first conductive film G1, is positioned on one side of the first conductive film G1 in the X direction, and the shield electrode S, which is formed on the same plane as the first conductive film G1, is positioned on the other side of the first conductive film G1 in the X direction. That is, the shield electrode S, being connected to the common electrode 228, is capable of serving as the second conductive film G2. Accordingly, an electric field can be produced between the signal electrode 229 and the second conductive film G2, as well as between the signal electrode 229 and the shield electrode S, and the liquid crystal molecules of the liquid crystal layer 23 can be controlled by the electric field, and also, the number of constituent components of the liquid crystal display device 1C can be reduced.

Moreover, in the liquid crystal display device 1C, the first conductive film G1, the second conductive film G2, and the shield electrode S are made of the same material. This makes it possible to form the first conductive film G1, the second conductive film G2, and the shield electrode S in the same film-forming and patterning process, and thereby simplify the manufacturing operation for the liquid crystal display device 1B.

The invention is not particularly limited to the first to fourth embodiments described hereinabove, and therefore various changes, modifications, and improvements are possible without departing from the scope of the invention.

REFERENCE SIGNS LIST 1, 1A, 1B, 1C: Liquid crystal display device
2: Liquid crystal panel
$E_D$: Display region
$E_N$: Non-display region
21: First substrate
21a: First main surface
21b: Second main surface (Main surface)
211: Color filter
22: Second substrate
22a: First main surface (Main surface)
22b: Second main surface
221: Gate line
222: Auxiliary capacitance line
223: Gate insulation film
224: Source line
225: First interlayer insulation film (First insulation film)
226: Second interlayer insulation film (Third insulation film)
227: Planarizing film (Second insulation film)
228: Common electrode
229: Signal electrode
2210: First wiring conductor
2211: Second wiring conductor
2212: Third wiring conductor
TFT: Thin-film transistor
S: Shield electrode
BM: Light-shielding film
D: Drain line
G1: First conductive film
G2: Second conductive film
C: Contact hole
H: Through hole
T: Connection conductor
23: Liquid crystal layer
24: Seal material
4: First polarizing plate
5: Second polarizing plate
3: Light source device
31: Light source
32: Light guiding plate

The invention claimed is:

1. A liquid crystal display device, comprising:
a first substrate and a second substrate disposed so that a main surface of the first substrate and a main surface of the second substrate are opposed to each other;
a liquid crystal layer placed between the first substrate and the second substrate;
a plurality of gate lines disposed on the main surface of the second substrate;
a plurality of source lines disposed on the main surface of the second substrate to be intersected by the plurality of gate lines;
a first insulation film placed on the main surface of the second substrate to cover the plurality of gate lines and the plurality of source lines;
a light-shielding film placed on the first insulation film to cover the plurality of source lines;
a second insulation film placed on the first insulation film to cover the plurality of gate lines, the plurality of source lines, and the light-shielding film;
a signal electrode disposed on the second insulation film; and
a common electrode disposed on the second insulation film, forming an electric field between the common electrode and the signal electrode,
a shield electrode being placed to lie between the signal electrode located in a region surrounded by the plurality of gate lines and the plurality of source lines, and the source line as seen in a plan view, as well as to lie between the first insulation film and the light-shielding film as seen in a sectional view, and
a third insulation film being placed between the shield electrode and the light-shielding film.

2. The liquid crystal display device according to claim 1, wherein an electrically-conductive film is placed between the first insulation film and the third insulation film to overlap the signal electrode and is electrically connected to the signal electrode, and
wherein the electrically-conductive film is placed on the same plane as the shield electrode, and is made of the same material as that used for the shield electrode.

3. The liquid crystal display device according to claim 1, wherein an electrically-conductive film is placed between the first insulation film and the third insulation film to overlap the common electrode and is electrically connected to the common electrode, and
wherein the electrically-conductive film is placed on the same plane as the shield electrode, and is made of the same material as that used for the shield electrode.

4. The liquid crystal display device according to claim 1, wherein a first conductive film is placed between the first insulation film and the third insulation film to overlap the signal electrode and is electrically connected to the signal electrode,
wherein a second conductive film is placed between the first insulation film and the third insulation film to overlap the common electrode and is electrically connected to the common electrode, and
wherein the first conductive film and the second conductive film are placed on the same plane as the shield electrode, and are made of the same material as that used for the shield electrode.

5. The liquid crystal display device according to claim 1, wherein the shield electrode is electrically connected to the common electrode.

6. The liquid crystal display device according to claim 1, wherein an auxiliary capacitance line is placed on the main surface of the second substrate to face the shield electrode through the third insulation film, and wherein the shield electrode is electrically connected to the auxiliary capacitance line.

\* \* \* \* \*